(12) United States Patent
Song et al.

(10) Patent No.: US 10,720,951 B2
(45) Date of Patent: Jul. 21, 2020

(54) MOBILE TERMINAL

(71) Applicant: LG ELECTRONICS INC., Seoul (KR)

(72) Inventors: Insu Song, Seoul (KR); Jaewook Lee, Seoul (KR); Sukho Hong, Seoul (KR); Jeongjoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/957,618

(22) Filed: Apr. 19, 2018

(65) Prior Publication Data

US 2019/0081653 A1 Mar. 14, 2019

(30) Foreign Application Priority Data

Sep. 8, 2017 (KR) ........................ 10-2017-0115315

(51) Int. Cl.
| | | |
|---|---|---|
| H04M 1/00 | (2006.01) |
| H04B 1/3888 | (2015.01) |
| H04M 1/02 | (2006.01) |
| G06F 1/16 | (2006.01) |
| H01Q 1/22 | (2006.01) |
| H01Q 1/24 | (2006.01) |
| H01Q 21/28 | (2006.01) |
| H01Q 13/10 | (2006.01) |
| H04B 1/38 | (2015.01) |

(Continued)

(52) U.S. Cl.
CPC ......... *H04B 1/3888* (2013.01); *G06F 1/1656* (2013.01); *H01Q 1/2291* (2013.01); *H01Q 1/243* (2013.01); *H01Q 13/10* (2013.01); *H01Q 21/28* (2013.01); *H04M 1/0202* (2013.01); *H04B 2001/3894* (2013.01); *H04M 1/0266* (2013.01); *H04M 1/18* (2013.01); *H04M 1/236* (2013.01)

(58) Field of Classification Search
CPC ........... H04B 1/3888; H04B 200/3894; H04M 1/0202
USPC ....................................... 455/575.8
See application file for complete search history.

(56) References Cited

U.S. PATENT DOCUMENTS

2015/0155614 A1* 6/2015 Youn ................... H04M 1/0249
343/702

FOREIGN PATENT DOCUMENTS

| EP | 1918800 | 5/2008 |
| EP | 1919267 | 5/2008 |

(Continued)

OTHER PUBLICATIONS

European Patent Office Application Serial No. 18190303.0, Search Report dated Jan. 25, 2019, 11 pages.

*Primary Examiner* — Huy C Ho
(74) *Attorney, Agent, or Firm* — Lee, Hong, Degerman, Kang & Waimey

(57) ABSTRACT

A mobile terminal includes a terminal body, a metal case forming an appearance of the terminal body and including a side region and a second region integrally formed with the side region and supporting the inside of the terminal body, and a rear molding part formed in a region of the metal caser. The rear molding part includes a first molding region formed to have a closed loop shape along an inner surface of the side region and a second molding region extending from the first molding region and forming a receiving space for receiving at least one electronic component. The side region includes a plurality of opening holes, and the first molding region is formed to cover the plurality of opening holes.

9 Claims, 8 Drawing Sheets

(51) Int. Cl.
*H04M 1/23* (2006.01)
*H04M 1/18* (2006.01)

(56) References Cited

FOREIGN PATENT DOCUMENTS

EP     2985982     2/2016
EP     3013021     4/2016

\* cited by examiner

MOBILE TERMINAL

CROSS-REFERENCE TO RELATED APPLICATION

Pursuant to 35 U.S.C. § 119(a), this application claims the benefit of earlier filing date and right of priority to Korean Patent Application No. 10-2017-0115315, filed on Sep. 8, 2017, the contents of which are hereby incorporated by reference herein in its entirety.

BACKGROUND OF THE INVENTION

1. Field of the Invention

The present disclosure relates to a waterproof-type mobile terminal having a metal case

2. Background of the Invention

Mobile terminals may be generally classified as mobile/portable terminals or stationary terminals according to their mobility. Mobile terminals may also be classified as handheld terminals or vehicle mounted terminals according to whether or not a user may directly carry the terminal.

Such terminals have various functions according to the development of technologies. For example, a terminal is implemented in the form of a multimedia device having a plurality of functions such as capturing an image or video, playing music or a video file, playing games, reception of a broadcast, and the like. Further, in order to support and enhance functions of terminals, it may be considered to improve the structural and/or software part of the terminals.

As a waterproof type terminal has recently been developed, a hole formed outside the terminal and a waterproof structure for blocking flow of water introduced through an assembly structure are added, so that it is difficult to secure an internal space and assembly is complicated.

SUMMARY OF THE INVENTION

Therefore, an aspect of the detailed description is to implement a simple waterproof structure.

To achieve these and other advantages and in accordance with the purpose of this specification, as embodied and broadly described herein, a mobile terminal includes: a terminal body, a metal case forming an appearance of the terminal body and including a side region and a second region supporting the inside of the terminal body, and a rear molding part formed in a region of the metal caser. The rear molding part includes a first molding region formed to have a closed loop shape along an inner surface of the side region and a second molding region extending from the first molding region and forming a receiving space for receiving at least one electronic component. The side region includes a plurality of opening holes, and the first molding region is formed to cover the plurality of opening holes. Thus, water introduced through the opening holes cannot pass through the first molding region having the closed shape, water cannot penetrate through the inside of the terminal body.

In an embodiment, a portion of the side region is demarcated by a slit part and radiates in a specific frequency band, and a slit molding part protruding from the first molding region is inserted into the slit part, and thus, a radiation region does not have a possibility of being in contact with other regions of the metal case, enhancing radiation quality.

In an embodiment, the first molding region may be formed on an opening hole for mounting of a key unit, and the first molding region may form an inner space allowing the key unit to be seated therein.

According to the present disclosure, since the front and rear molding parts are formed along an inner surface of a region forming a side surface of the terminal body and have a closed loop shape, a problem that a portion is separated in a state of being mounted in the metal case may be prevented.

Also, although water is introduced due to the slit formed in the metal case, water cannot escape from between the side region of the metal case and the first molding region of the rear molding part due to the closed loop shape of the first molding region. Thus, introduced water is prevented from being introduced to the inside of the terminal body, enhancing waterproof quality.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
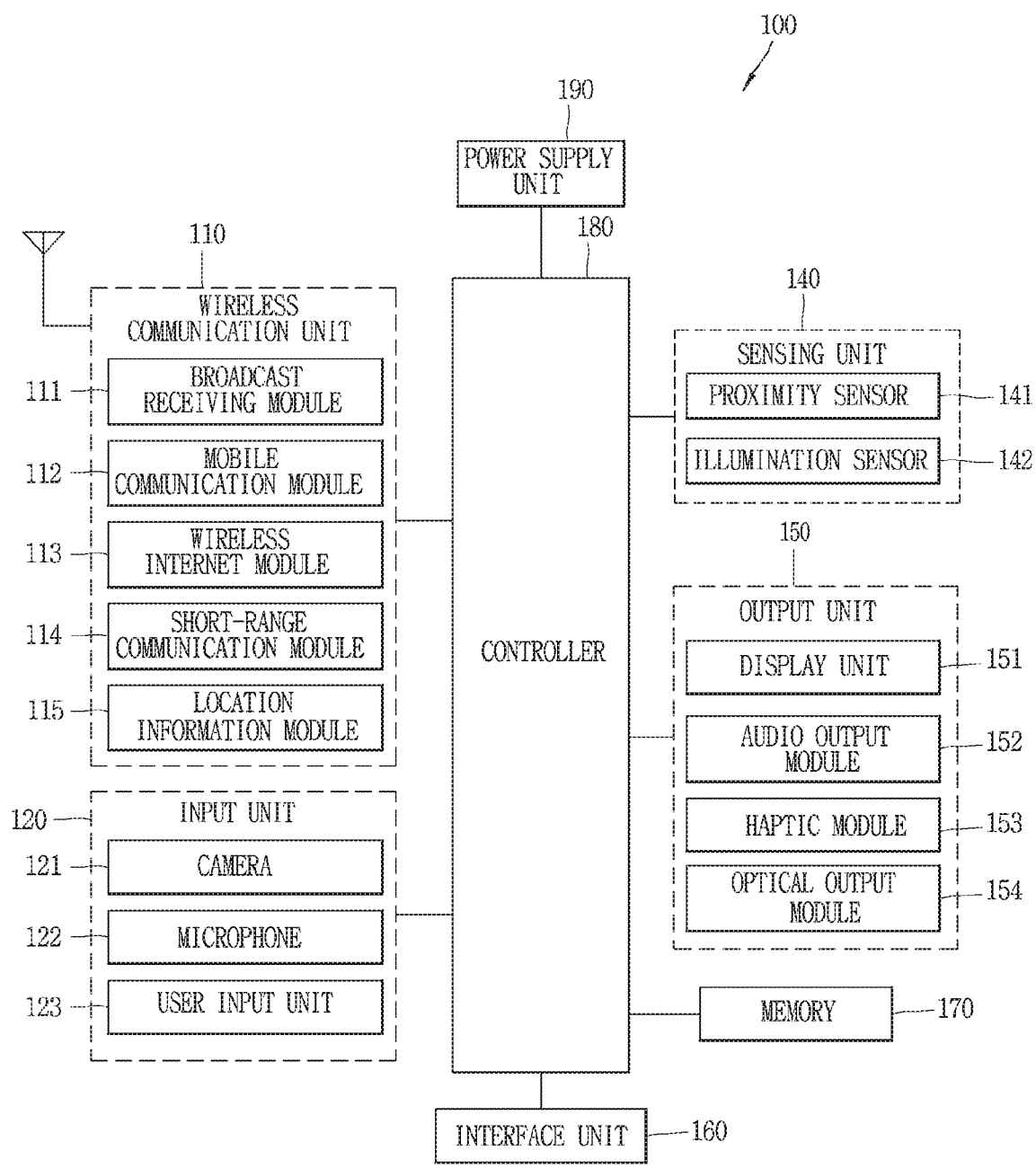
FIG. 1A is a block diagram of a mobile terminal in accordance with the present disclosure.

First, FIG. 1A is a block diagram illustrating a mobile terminal 100 related to the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 may control the mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform the controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, the mobile terminal according to an embodiment of the present disclosure described above in FIG. 1A or a structure of terminal in which the aforementioned components are disposed will be described with reference to FIG. 1C.

Figure 1B:
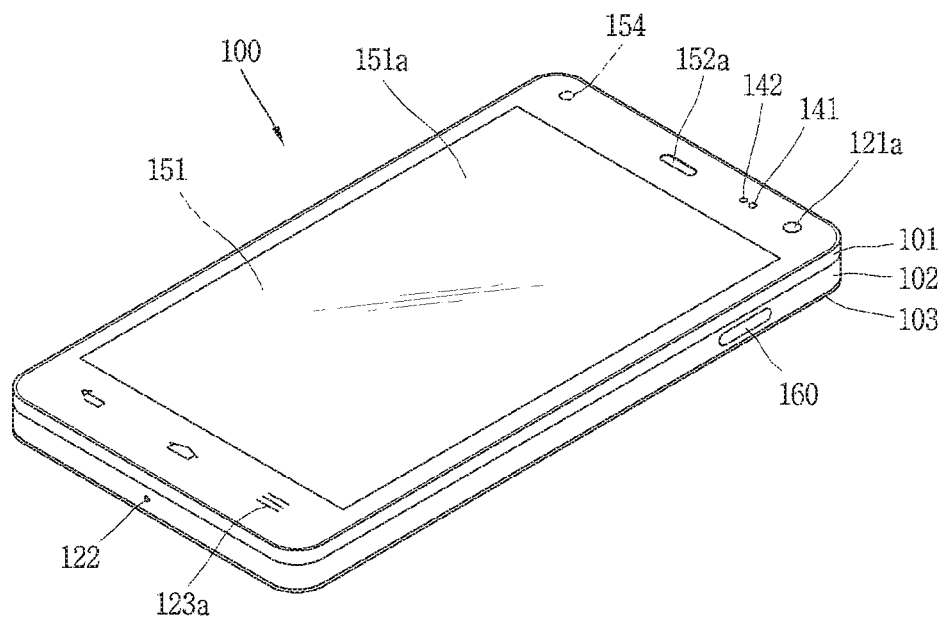
FIGS. 1B and 1C are conceptual views of one example of the mobile terminal, viewed from different directions.
Figure 1C:
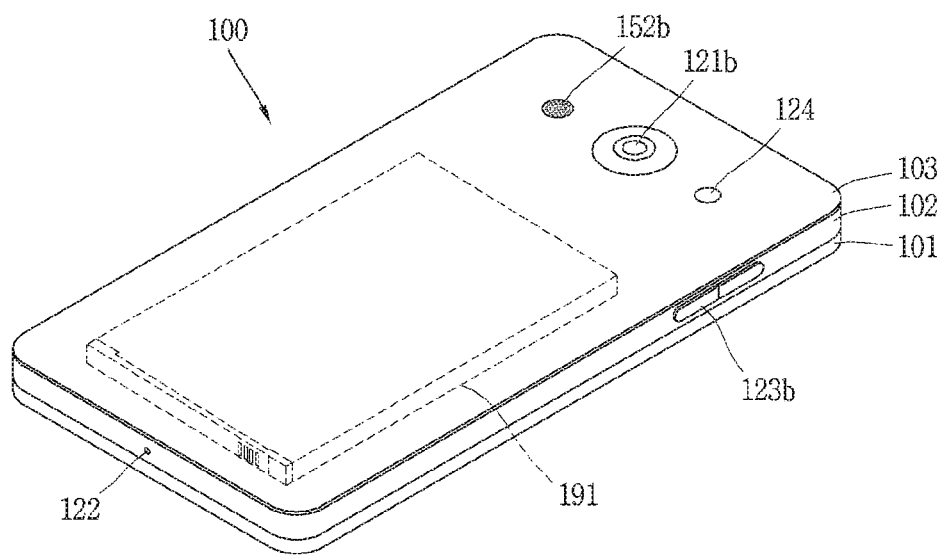

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display is (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which may implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. Hereinafter, for the purposes of description, a display unit (display module) outputting an image and the touch sensor are integrated to be called a touch screen 151.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 may output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit may be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user may easily manipulate it using a forefinger when the user grabs the terminal body with one hand. Alternatively, the rear input unit may be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 may have a larger screen.

As a further alternative, the mobile terminal 100 may include a finger scan sensor which scans a user's fingerprint. The controller 180 may then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 may be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
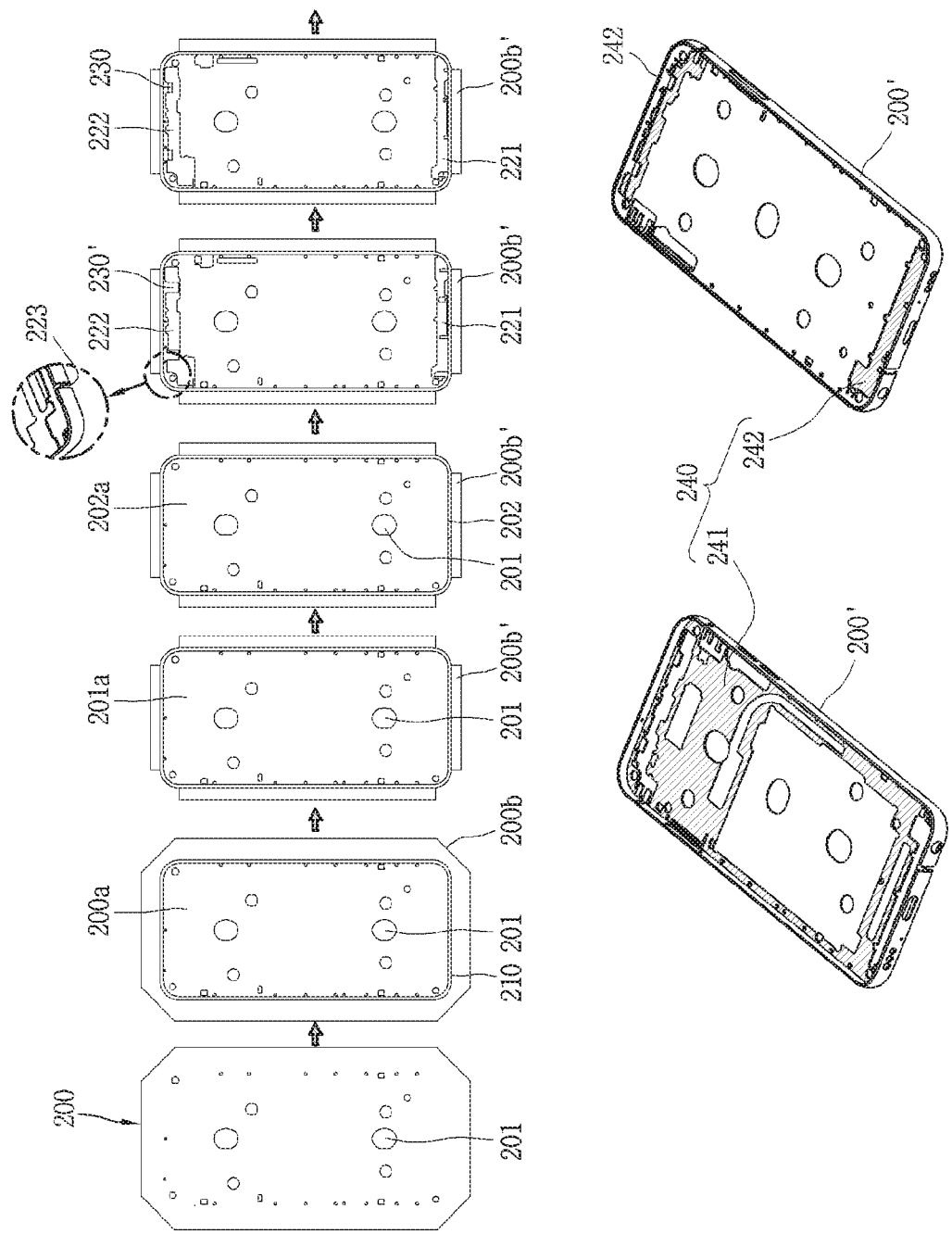
FIG. 2A is a conceptual view illustrating a process of manufacturing a metal case of the present disclosure.

FIG. 2A is a conceptual view illustrating a process of manufacturing a metal case of the present disclosure.

Figure 2B:
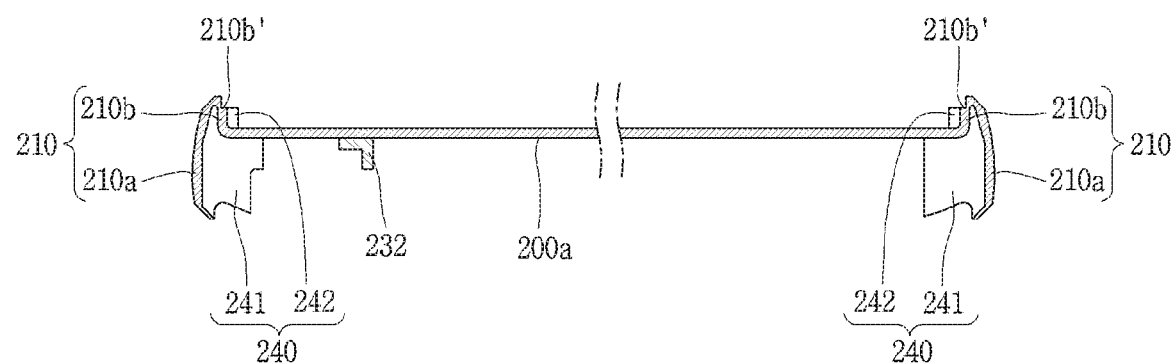
FIG. 2B is a cross-sectional view of a metal case in which a molding part is installed.

FIG. 2B is a cross-sectional view of a metal case in which a molding part is installed.

A metal case according to the present disclosure is formed by a plate-shaped base member 200. The base member 200 includes a plurality of first holes 201 (piercing step). The first holes 201 may correspond to openings for mounting an assembly hole electronic component and a flexible circuit board for assembling a case, a circuit board, and the like. The first holes 201 are formed in different sizes.

A side region 210 is formed by applying pressure to the base member 200 on which the plurality of first holes 201 are formed. Referring to FIGS. 2A and 2B, a first region 210a is formed by applying pressure to one surface of the base member 200, and a third region 210b is formed by applying pressure to the other surface of the base member 200.

The side region 210 may have a curved shape in a side surface due to the pressure. The curved shape may be formed inside the side region 210. The molding part may be easily mounted on the side region 210 due to the curved shape formed on an inner circumferential surface of the side region 210 and a problem of separation of the molding part may be minimized.

The third region 210b overlaps the first region 210a. The third region 210b bent from the first region 210a. Since the first and third regions 210a and 210b overlap each other, rigidity of the side surface portion of the terminal body may be improved. In addition, since the first and third regions 210a and 210b may be elastically deformed by an external impact due to the overlapped shape, durability of the metal case may be improved.

When the side region 210 is formed by pressure applied to the front surface and the rear surface, a second region 200a for supporting an electronic component inside the terminal body is formed inside the side region 210. A remaining region 200b is formed outside the side region 210. The remaining region 200b may form the side region 210 and a remaining region 200b' may be removed.

After the side region 210 is formed, a plurality of opening regions 221 and 222 are formed in the second region 200a of the base member 200. The opening regions 221 and 222 are formed in the upper and lower portions of the base member 200 and are formed within the side region 210. In addition, the side region 210 may include an opening region. The side region 210 may include a slit part 223 exposed to an outer surface of the terminal body. A region of the side region 210 of the metal material demarcated by the slit part 223 is realized as a radiator of a specific frequency band of an antenna unit 110'.

Since the base member 200 is made of a metal plate having a uniform thickness, the side region 210 formed of the base member 200 has a uniform thickness, and thus, radiation quality of a radiation region forming an antenna may be improved.

A plurality of protrusions 232 protruding from the second region 200a and the side region 210 are formed by the opening regions 221 and 222. The plurality of protrusions 232 are formed to be plane. In a next step, pressure may be applied to the plurality of protrusions to bend the protrusions. The bent protrusions are formed on a plane different from the second region 200a and electrically connect a region of the metal case to a circuit board 181, or the like.

The second region 200a, the side region 210, the plurality of protrusions, and the plurality of ribs, which form the metal case, are integrally formed, and although the opening region and the slit part are formed, the structures are not disconnected. Therefore, since a fastening member and an adhesive member for connecting a disconnected structure are not required, a simple and lightweight metal case may be realized.

After the side region 210 and the plurality of slit portions 223 are formed, a chemical etching step is performed before forming the molding part. The deformed base member 200 is easily adhered to the molding part through the chemical etching step.

After the shape of the metal case 200' is completed, the molding part 240 is formed. The molding part 240 is formed by an injection molding method. The molding part 240 includes a rear molding part 241 and a front molding part 242. The rear and front molding parts 241 and 242 has a dosed loop shape and is formed along an inner circumferential surface of the side region 210. In addition, one area of the plurality of opening regions is filled by the molding part 240. In addition, the molding part 240 may be formed in a portion of the opening region formed in the second region 200a.

Since the molding part 240 is formed as a closed loop along the inner circumferential surface of the side region 210, the molding part 240 may be prevented from being separated from the metal case 200'.

Referring to FIG. 2B, the molding part 240 includes the rear molding part 241 formed between the first and third regions 210a and 210b. A side structure of the terminal body including the rear molding part 241 may be formed to be lighter than a side structure of the terminal body made of only a metal material.

Referring to FIG. 2B, the third region 210b may include a step 210b' formed by pressure, and the front molding part 242 may be formed to form a plane with the step 210b'. For example, the window 151a may be supported by the step 210b' between the front molding part 242 and the third region 210b.

The metal case according to the present embodiment is formed of an opening region which is deformed by applying pressure to a metal plate and which is formed through an etching step. Thicknesses of respective areas of the metal case are substantially the same. In addition, elasticity and durability of the side part of the terminal body may be improved by the first and third regions 210a and 210b of the side region 210 which overlap each other. Since the molding part is formed between the first and third regions to form the thickness of the side part of the terminal body, a weight may be reduced compared to a case where the side surface of the terminal body is made of only a metal material.

Since the molding part is implemented in a closed loop shape along the side region, separation of the molding part from m the metal case may be prevented.

In the metal case according to the embodiment of the present disclosure, a region of the side region 210 forming an appearance of the terminal body may be Implemented as a radiator of the antenna unit 110'. Hereinafter, the antenna unit 110' will be described.

Figure 3A:
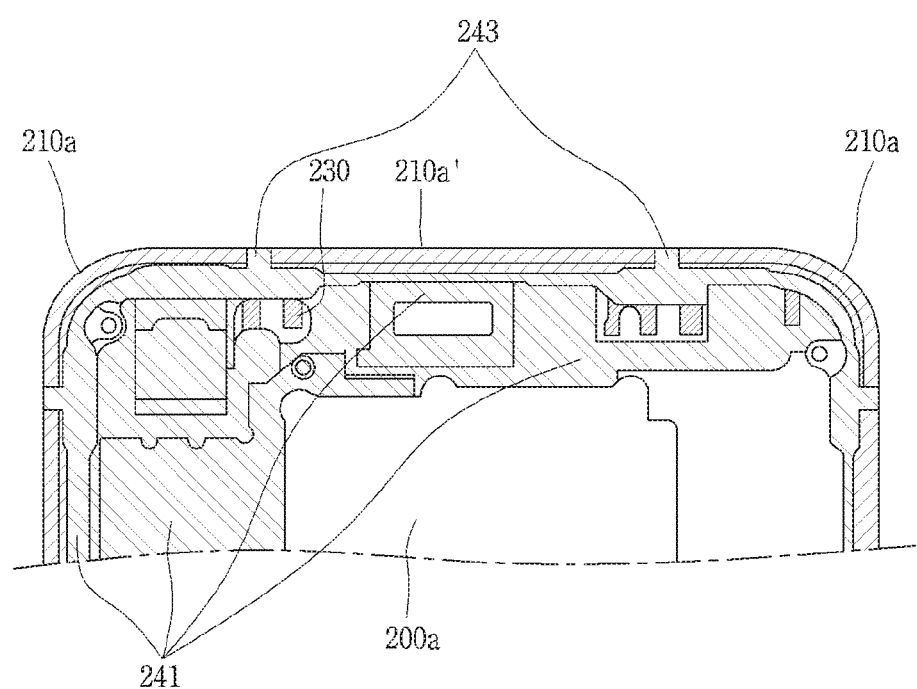
FIG. 3A is a partial conceptual view illustrating a radiation region formed in a metal frame to explain a radiator of an antenna unit.

FIG. 3A is a partial conceptual view illustrating a radiation region formed in a metal frame to explain a radiator of the antenna unit.

Referring to FIG. 3A, a portion of the first region 210a of the side region 210 forming an outer surface of the terminal body is implemented as a radiation region 210a' included in the antenna unit 110'.

The radiation region 210a' included in the first region 210 is demarcated with respect to the other remaining regions of the first region 210a by the slit part 223 (See FIG. 2A) formed in the first region 210a and a slit molding part 243 formed in the slit part 223. Also, the radiation region 210a' is electrically disconnected from the second region 200a by the opening region 222 (See FIG. 2A) and the rear molding part 241 formed in the opening region 222. Thus, the radiation region 210a' is electrically isolated from the remaining region of the metal case 200'.

The radiation region 210a' is formed by a slit part 223 formed in an etching manner and the slit molding part 243 filled in the slit portion 223, and the slit molding part 243 is integrally formed with the remaining region of the rear molding part 241 formed on the second region 200a. In this manner, the radiation region 210a' is separated from the other regions by the slit molding part 243 formed of an insulating material demarcating the radiation region 210a'. Thus, there is no possibility that the radiation region 210a' is electrically in contact with the other remaining region, thus stably implementing the radiation region of the antenna unit.

The radiation region 210a' is electrically connected to an antenna chip disposed on the circuit board 181 by a region extending from the radiation region 210a'.

Although not specifically shown in the drawings, an additional antenna pattern may be formed on the front and rear molding parts 242 and 241. A frequency band of the antenna unit may be set by the additional antenna pattern.

Since the additional antenna pattern is formed on the front and rear molding parts 242 and 241 which are adjacent to the radiation area 210a' and made of an insulating material, a structure such as an insulating carrier for forming an antenna pattern is unnecessary. Thus, the structure of the inside of the terminal is simplified and a lightweight mobile terminal may be realized.

Figure 3B:
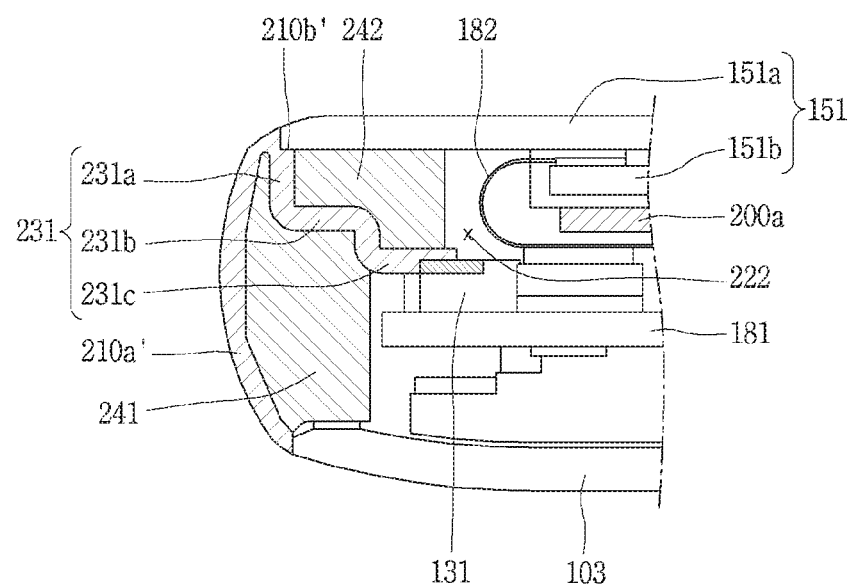
FIG. 3B is a conceptual view illustrating a connection protrusion according to an embodiment.

FIG. 3B is a conceptual view illustrating a connection protrusion according to another embodiment.

Referring to FIG. 3B, the first region 210a of the side region 210 is formed as a radiation region. The third region 210b extends from the first region 210a and first and second bent regions 231a and 231b are bent from the third region 210b. The third region 210b and the first and second bent regions 231a and 231b constitute a first connection protrusion 231. The first connection protrusion 231 electrically connects the radiation region 210a' to an antenna chip 131 disposed on the circuit board 181.

The first connection protrusion 231 is separated from the second region 200a by the opening region 222. The second region 200a supports a display panel 151b. A flexible circuit board 181 electrically connecting the display panel 151b and the circuit board 181 passes through the opening region 222 formed between the second region 200a and the first connection protrusion 231.

The end of the first connection protrusion 231 may reach the circuit board 181 disposed below the display panel 151b due to the bent shape of the first and second bent parts 231a and 231b.

The first and second bent parts 231a and 231b are formed by an additional press step after the opening region 222 is formed. The opening region 222 is formed to surround the first connection protrusion 231. The radiation region 210a' may be formed to be electrically disconnected from the other region of the metal case, except for a portion connected to the first connection protrusion 231.

The first connection protrusion 231 corresponds to a portion of the base member 200, and thus, it is formed integrally with the radiation region 210a'. Therefore, a separate connection member for connecting the radiation region 210' to the antenna chip 131 is unnecessary. Therefore, since additional members such as a conductive fastening member, a flexible circuit board, and the like, formed in one region forming the appearance of the terminal body are not required, a manufacturing process is simple and a weight of the terminal body may be reduced.

The front molding part 242 is formed on the first connection protrusion 231. The front molding part 242 is filled in one region of the opening region 222 and forms a space separated from the display panel 151b so that the flexible circuit board 182 passes therethrough.

The window 151a is supported on the step 210b' of the third region 210b included in the front molding part 242 and the first connection protrusion 231. The edge of the window 151a is seated on the step 210b'. Although not shown, an adhesive member may be formed between the front molding part 242 and the window 151a to adhere the window 151a.

The rear molding part 241 is formed between the first connection protrusion 231 and the radiation region 210a'. The rear molding part 241 is not disposed only at the lower part of the radiation region 210aa' but formed at a position adjacent to the remaining region of the first region 210a, rather than the radiation region 210a'.

The rear molding part 241 has an adhesive space on which the rear cover 103 is seated and to which the rear cover 103 may be adhered.

The rear molding part 241 and the first region 210a (and the radiation region 210a') form a thickness of the case that forms the appearance of the terminal body.

Since the thickness of the case is formed of the metal region forming the outer surface and the molding region forming the inside, the weight may be minimized. That is, a lightweight case, compared with a case in which a thickness of the case is formed only by the metal material, may be provided.

Also, the radiation region 210a' of the antenna unit, the display panel 151b, and the circuit board 181 are spaced apart from each other by the front and rear molding parts 242 and 241. Therefore, since a distance between the radiation region 210' and the display panel 151b is increased, an influence of noise affecting a radiation function of the radiation region 210a' may be reduced.

If the thickness of the metal case forming the terminal body is made of a metal material without the molding part, the radiation region of the antenna unit and the display panel are disposed relatively close to each other, degrading quality of the radiation function due to noise generated in the electronic components disposed in the display panel and the circuit board. In contrast, since a distance between the radiation region and the electronic component disposed inside the terminal body is secured by the molding part, and radiation quality of the antenna may be improved.

Further, since the radiation region 210a' of the antenna unit is formed by the plate-shaped base part, the radiation region 210a' has substantially the same thickness. Therefore, a more stable radiation function may be realized.

Figure 4A:
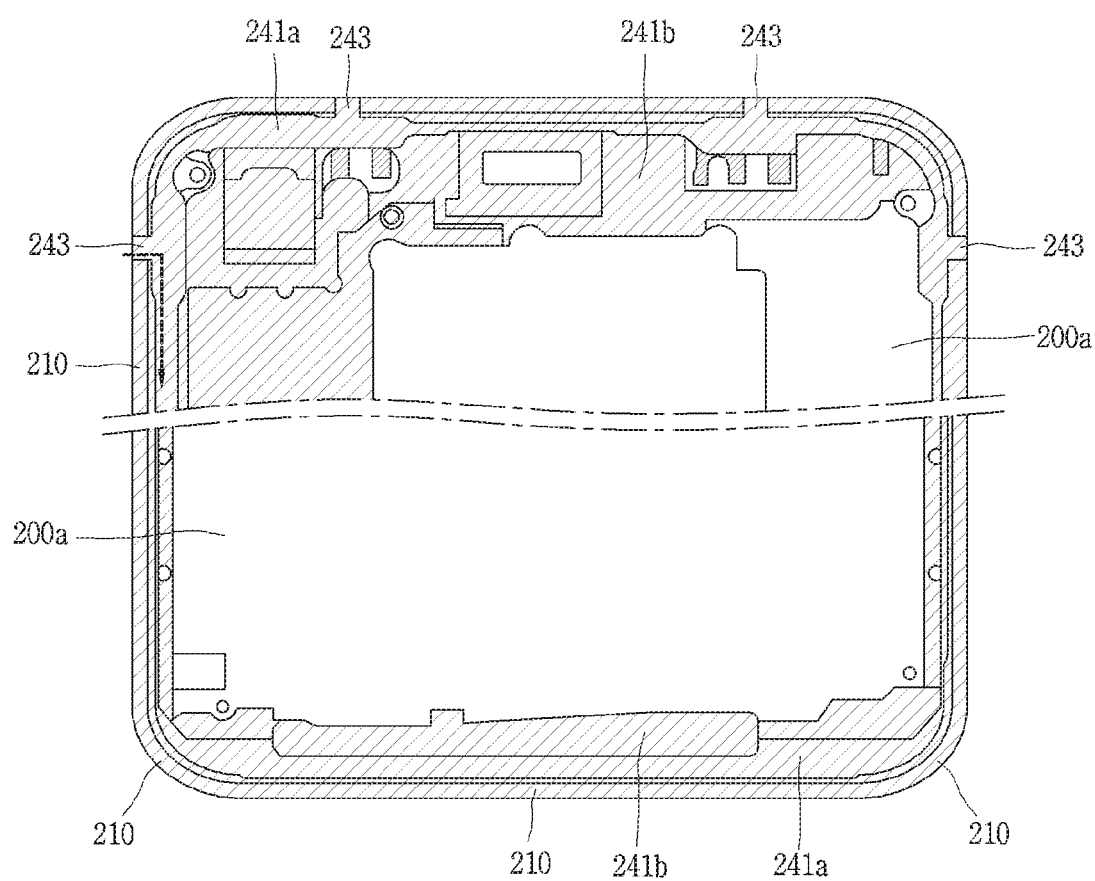
FIG. 4A is a conceptual view of a rear surface of a metal case in which a molding part is installed.

FIG. 4A is a conceptual view of a rear surface of a metal case with a molding part.

Figure 4B:
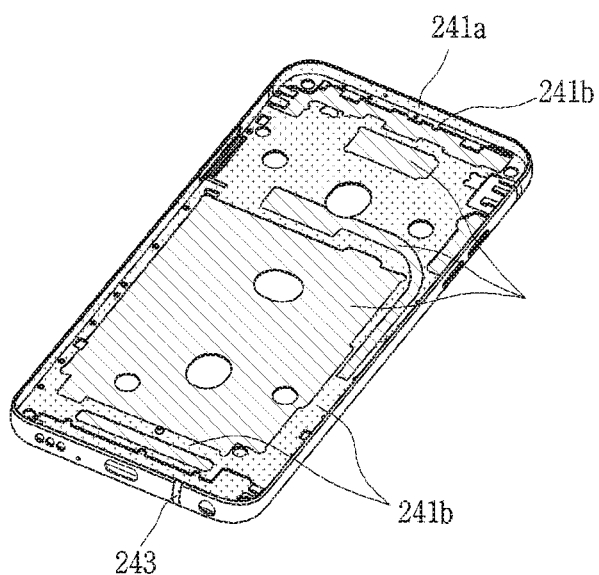
FIGS. 4B and 4C are perspective views illustrating a front surface and a rear surface of a metal case in which a molding part is installed.
Figure 4C:
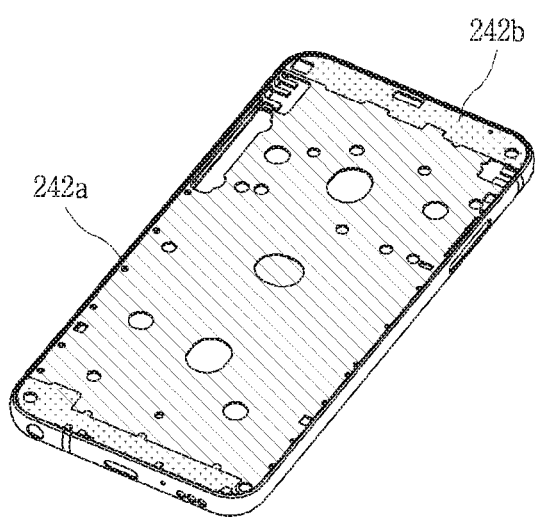

FIGS. 4B and 4C are perspective views illustrating a rear surface and a front surface of the metal case with the molding part mounted thereon.

Referring to FIGS. 4A and 4B, the rear molding part 241 includes a first molding region 241a formed within the side region 210 and a second molding region 241b extending from the first molding region 241a and formed on the second region 200a and the opening regions 221 and 222. The first and second molding regions 241a and 241b are integrally formed.

The first molding region 241a has a closed loop shape. The slit molding part 243 protrudes from the first molding region 241a and filling the slit part 223.

The second molding region 241b forms a receiving space for disposing a plurality of electronic components. For example, the second molding region 241b may be formed on the second region 200a to form a space in which the power supply unit 190 is disposed, and may be formed on the opening region 222 to form a space in which the camera module 121 may be mounted.

Since the complicated structure inside terminal body is formed as the molding part, a manufacturing process is relatively easy and an error occurring in the manufacturing process may be minimized. In addition, the weight of the terminal body itself may be minimized.

Water may be introduced between the molding part and the metal case. For example, moisture may be introduced into the slit part 223 filled with the slit molding part 243. However, since the first molding region 241a of the rear molding part 241 has a closed loop shape along the inner surface of the side region 210, it is difficult for the introduced moisture to escape from between the rear molding part 241 and the side region 210.

That is, water introduced into a gap between the molding part of the slit part 223 and the metal case cannot move to the inside of the metal case.

Referring to FIG. 4C, the front molding part 242 also includes a first molding region 242a forming a dosed loop along the side region 210 forming a front surface and a second molding region 242b extending from the first molding region 242a. The second molding region 242b is formed to provide a space for disposing electronic parts in the second region 200a and/or the opening regions 221 and 222. In addition, the first molding region 242b forms an adhesive region for adhering the window 151a.

The front and rear molding parts according to the present disclosure are formed along the inner surface of a region forming a side surface of the terminal body and have a dosed slop shape to prevent a part from being separated from the metal case.

Even if water is introduced by the slit formed in the metal case, the water cannot escape from between the side region 210 of the metal case and the first molding region 241a of the rear molding part 241. Accordingly, water is prevented from being introduced to the inside of the terminal body, improving waterproof quality.

Figure 4D:
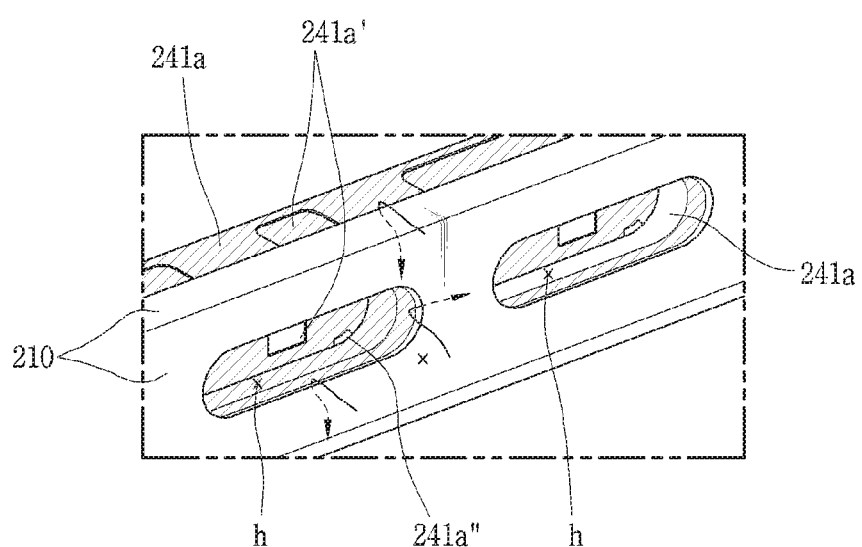
FIG. 4D is a partially enlarged view illustrating holes formed on a side region.

FIG. 4D is a partially enlarged view illustrating holes formed in a side region.

Referring to FIG. 4D, the side region 210b of the metal case includes a plurality of holes h. The holes h form space in which key units for implementing the user input unit 123 are to be disposed.

The first molding region 241a of the rear molding part 241 is formed on the inner surface of the side region 210b forming the hole h. The first molding region 241a forms an inner space allowing the key unit to be seated therein. An inner circumference of the inner space may be substantially the same as an inner circumference of the hole h.

The first molding region 241a may include a plurality of fastening holes 241a' (or fastening recesses). The fastening holes 241a' allows for assembling with other components or assembling of the key unit. In addition, the first molding region 241a includes a through hole 241a" through which a flexible circuit board, or the like, may pass. Accordingly, the key unit may be seated in the receiving space formed by the hole h and the first molding region 241a.

The fastening holes and the through holes of the first molding region 241a may be formed by an etching step after the rear molding part 241 is formed in the metal case.

Although not shown in the drawing, the first molding region 241a of the rear molding part 241 may extend to the inner surface of the hole h and one region thereof may be exposed to the outside. For example, in the case of a hole into which an earjack is inserted, the first molding region 241a may be formed on the inner circumferential surface thereof.

Water may be introduced due to a gap between the side region 210 of the metal case forming the hole h and the first molding region 241a. In this case, however, since the first molding region 241a is formed as a closed loop along the inner surface of the side region 210, introduced water cannot flow into the terminal body.

Even when water is introduced between the metal case and the molding part, introduction of water to the inside of the terminal may be prevented due to the molding part which is integrally formed and forms a closed loop along the side region of the terminal body. Therefore, movement of water introduced into the assembled structure of the case may be prevented without forming an additional waterproofing member.

The present disclosure described above may be implemented as a computer-readable code in a medium in which a program is recorded. The computer-readable medium includes any type of recording device in which data that may be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a terminal body;
   a display unit;
   an antenna unit comprising a feeding unit disposed within the terminal body;
   a metal case configured to form an appearance of the terminal body; and
   a molding part,
   wherein the metal case comprises:
   a first region configured to form a side region of the terminal body;
   a second region configured to support the display unit; and
   a third region between the first region and the second region, wherein the third region protrudes from a side of the second region, bends from the first region, and overlaps with the first region, and
   wherein the molding part is configured to form a closed loop along an inner side of the first region of the metal case and comprises a rear molding part disposed between the first region and the third region and disposed adjacent to a portion of the second region,
   wherein the rear molding part comprises a first molding region formed along an inner side of the first region and a second molding region extending from the first molding region and defining a receiving space configured to accommodate at least one electronic component,
   wherein the first region of the metal case comprises a plurality of openings along the side region of the terminal body and the plurality of openings are filled with a portion of the first molding region,
   wherein a radiation region included in the first region is electrically disconnected from the second region by an opening region, wherein the metal case further comprises openings disposed between the first region of the metal case and the second region of the metal case such that the third region of the metal case is not connected to the second region of the metal case,
   wherein the part of the third region is connected to the feeding unit to form an electric length of the antenna together with a part of the first region, and
   wherein the first and second molding regions are integrally formed.

2. The mobile terminal of claim 1, wherein
   the first molding region is configured to cover one or more of the plurality of openings.

3. The mobile terminal of claim 2, further comprising an antenna unit configured to operate in a specific frequency band, wherein the antenna unit comprises a portion of the first region as a radiator of the antenna unit,
   wherein:
   the plurality of openings comprise one or more slits adjacent to the portion of the first region.

4. The mobile terminal of claim 2, further comprising an input key unit disposed in one of the plurality of openings and configured for inputting a control signal,
   wherein the first molding region comprises a molding hole corresponding to the one of the plurality of openings and configured to accommodate the input key unit.

5. The mobile terminal of claim 4, wherein a circumference of the one of the plurality of openings and a circumference of the molding hole are the same.

6. The mobile terminal of claim 2, wherein the rear molding part comprises an exposed region extending from the first molding portion and into one of the openings of the plurality of openings such that the exposed region is exposed to an exterior of the mobile terminal.

7. The mobile terminal of claim 1, wherein:
   the second region comprises at least one open region; and
   the second molding region of the rear molding part is configured to cover a portion of the at least one open region.

8. The mobile terminal of claim 1, wherein the molding part further comprises a front molding part configured to form a closed loop along an inner side of the third region of the metal case.

9. The mobile terminal of claim 8, wherein:
   the display unit comprises a display panel and a window; and
   the window is mounted on the front molding part.

* * * * *